United States Patent
Cho

(10) Patent No.: US 8,805,386 B2
(45) Date of Patent: Aug. 12, 2014

(54) NETWORK CLUSTERING DEVICE FOR WIRELESS MOBILE COMMUNICATION NETWORK AND NETWORK CLUSTERING METHOD

(75) Inventor: Kwangsun Cho, Ansan-shi (KR)

(73) Assignee: Nomadic Technologies Inc., Seongnam-shi (KR)

( * ) Notice: Subject to any disclaimer, the term of this patent is extended or adjusted under 35 U.S.C. 154(b) by 2182 days.

(21) Appl. No.: 11/722,399

(22) PCT Filed: Nov. 23, 2005

(86) PCT No.: PCT/KR2005/003966
§ 371 (c)(1),
(2), (4) Date: Jun. 21, 2007

(87) PCT Pub. No.: WO2006/068370
PCT Pub. Date: Jun. 29, 2006

(65) Prior Publication Data
US 2014/0146704 A1      May 29, 2014

(30) Foreign Application Priority Data

Dec. 24, 2004   (KR) .................. 10-2004-0112566

(51) Int. Cl.
*H04W 72/00* (2009.01)
(52) U.S. Cl.
USPC ........... 455/450; 455/446; 455/447; 370/329; 370/331; 370/338

(58) Field of Classification Search
CPC ..... H04W 16/02; H04W 16/04; H04W 16/06; H04W 16/10; H04W 16/14; H04W 28/02; H04W 28/16; H04W 72/00
USPC ........... 455/446, 447, 450; 370/329, 331, 338
See application file for complete search history.

(56) References Cited

U.S. PATENT DOCUMENTS

| 6,023,625 | A | 2/2000 | Myers, Jr. |
| 8,111,682 | B2 * | 2/2012 | Benveniste .................. 370/349 |
| 8,503,414 | B2 * | 8/2013 | Ho et al. ...................... 370/338 |
| 2004/0106411 | A1 | 6/2004 | Nguyen et al. |
| 2004/0235468 | A1 * | 11/2004 | Luebke et al. ............. 455/426.1 |
| 2012/0069832 | A1 * | 3/2012 | Benveniste .................. 370/338 |

FOREIGN PATENT DOCUMENTS

WO    WO 02/087176  A2    10/2002

* cited by examiner

*Primary Examiner* — Amancio Gonzalez
(74) *Attorney, Agent, or Firm* — Sughrue Mion, PLLC

(57) ABSTRACT

The present invention is related to a network clustering device and a method for expanding communication coverage and increasing network capacity by mutually connecting homogeneous or heterogeneous wireless mobile communication networks. By including a plurality of RF transceiver units and a network performance measuring unit, various frequency bands already occupied by surrounding wireless mobile communication networks are coordinated with the network clustering device to avoid frequency interferences among networks, to expand the communication coverage of the homogeneous or heterogeneous wireless mobile communication networks with ease, and to prevent a degradation of a network performance.

23 Claims, 12 Drawing Sheets

BSS

BSS

NETWORK CLUSTERING DEVICE FOR WIRELESS MOBILE COMMUNICATION NETWORK AND NETWORK CLUSTERING METHOD

This is a National Stage application under 35 U.S.C. §371 of PCT/KR2005/003966 filed Nov. 23, 2005, which claims benefit from Korean Patent Application 10-2004-0112566 filed Dec. 24, 2004, which are incorporated herein by reference.

TECHNICAL FIELD

The present invention relates to a network clustering device for wireless mobile communication network using unlicensed frequency bands such as ISM (Industrial, Scientific, and Medical) frequency band.

BACKGROUND ART

An ISM frequency band is an unlicensed frequency band allocated for industrial, scientific and medical use which utilizes weak electric field intensity. Recently, since a usable frequency band is decreased due to an increase in a use and a popularization of a wireless communication device, an attempt to utilize the ISM frequency band which is the unlicensed frequency band has been increasing. Particularly, a utilization of a wireless communication using the ISM band is actively considered as a replacement means to solve the depletion of available frequency bands.

Due to the above reasons, many equipment and devices are used in the ISM band without supports from network operator for network management and its operation. However, an interference caused by a user who arbitrarily installs and uses various equipment and devices is problematic, in the case of occurring communication interference, and brings down performance degradation and even worse, equipment malfunction.

Among frequency bands of 2.4-2.4835 GHz and 5.725-5.85 GHz which are expected to be rapidly increased in the near future in the ISM bands, although there is a serious amount of RF activities and noise power in a 2.4 GHz band in particular, the number of communication devices using the corresponding band is continuously increased. In addition, the number of communication devices using 5.8 GHz band such as an ITS (Intelligent Transportation System) and a high speed wireless access network is rapidly deployed. Therefore, there is a high possibility that serious problems such as the equipment malfunction and the communication interference may occur because various equipments are operated without any control within the ISM frequency band.

On the other hand, a broadband wireless LAN only allows a limited number of channels so that interferences between access points is apt to be generated when the access points are installed and used arbitrarily. For example, in the case of a DSSS (Direct Sequence Spread Spectrum) of IEEE 802.11 and 802.11b, although a use of 11 channels are allowed (in the U.S.) in the 2.4 GHz band, a frequency range between center frequencies in the bands should be separated wider than 25 MHz in order to prevent an interference between channels. Therefore, only three non-interference channels can be used. Even if IEEE 802.11a uses a 5 GHz U-NII (Unlicensed National Information Infrastructure), eight non-interference channels for indoors and four non-interference channels for outdoors are allowed.

Currently, when a wireless LAN is set up to provide a broadband wireless LAN service within a communication coverage limited to a predetermined region, a sufficient number of wireless LAN access points should be installed and an overlapping frequency should not be allowed between the access points in order to provide an uninterrupted service. However, an allocation of limited number of the non-interference channel and a frequent use of communication equipment utilizing an unlicensed frequency (ISM or U-NII) may result in a degradation of a quality of the broadband wireless LAN service due to an uncontrolled channel access induced by an arbitrary wireless equipment user in a surrounding environment.

Moreover, when a frequency having higher frequency band than 2.4 GHz and 5 GHz is used in order to increase a data transfer rate higher than the current broadband wireless LAN, a large radio wave shadow region may be generated by ambient obstacles existing in the line of sight. More broadband wireless LAN access point should be used in order to supplement this, resulting in an increase of the interference due to an overlapping of used channels between access points.

In the case of a cellular network, an accurate cell planning is carried out, considering various variables such as a fading due to a topology characteristic and an artificial structure, radio wave interference due to a multiple path and the number of subscribers who will place a call in a corresponding cell. The entire design, construction and management regarding to these tasks are carried out by radio engineering professionals. However, contrary to the cellular network, in the case of the construction and management of the broadband wireless LAN, it is common that a LAN based on a wire is simply replaced by the wireless LAN. Particularly, such designing, construction and management of the wireless LAN network are commonly carried out by general users or an IT manager of an who has little knowledge on radio engineering.

Moreover, the access point of the broadband wireless LAN and a broadband wireless LAN card are manufactured to be easily used by a general computer user. Therefore, only basic values of network equipment are commonly preset so that the general user can install without an understanding of a sophisticated internal working mechanism, thereby excluding a professional process such as preventing interferences between corresponding equipment and card and other equipments.

Such a simple designing and construction of the network without considering a cause of interference due to the use of the unlicensed frequency may result in following serious problems. For example, in the case of an office or a multiple dwelling unit (MDU), when another user installs his/her own wireless LAN an uninterrupted wireless LAN service is obstructed due to the interferences with the existing wireless LAN users or users who will install and use the wireless LAN later.

Aside from such frequency interferences between wireless local area networks, when the sufficient number of access points are not installed in the process of a BSS (Basic Service Set) planning, isolated BSSs such as BSS1 and BSS2 shown in FIG. 1 may occur. Here, a moving station STA1 cannot establish a connection to the wireless LAN from a moment the station STA1 is out of the first BSS BSS1 until a moment the station STA1 reaches the second BSS BSS2, resulting in a problem of an interrupted communication. In addition, a direct relay of a message is not possible between stations STA1 and STA2 located in the first BSS BSS1 and stations STA3 and STA4 located in the second BSS BSS2.

Moreover, in the case of a single BSS, when the number of stations connecting to an access point in the corresponding BSS increases, a problem of a communication interruption or a degradation of a communication quality due to an excess of a network capacity may occur.

DISCLOSURE OF INVENTION

Technical Problem

It is an object of the present invention to provide a network clustering device in a wireless mobile communication network and a network clustering method wherein a plurality of RF transceiver units and a network performance measuring unit is included to prevent a frequency interference between networks by detecting a use of various frequency bands occupied by adjacent wireless mobile communication networks.

In accordance with an embodiment of the present invention, it is an object of the present invention to provide a network clustering device for a wireless mobile communication network and a network clustering method wherein a network interface unit capable of establishing a connection to a wired network is further included so that the wireless mobile communication network including the network clustering device may be connected to the wired network.

In accordance with another embodiment of the present invention, it is an object of the present invention to provide a network clustering device for a wireless mobile communication network and a network clustering method wherein in the case of searching other network clustering devices within a communication coverage, by way of providing routing paths to a plurality of network clustering devices and a network clustering device in the wireless communication network, a network service coverage is increased and an efficiency of routing paths is raised by minimizing interferences between overlapped channels to provide good quality of communication service.

In accordance with yet another embodiment of the present invention, it is an object of the present invention to provide a network clustering device for a wireless mobile communication network and a network clustering method wherein the wireless mobile communication network is easily expanded through a direct message relay between communication devices in a network included in different BSS or IBSS (Independent Basic Service Set) by searching for a plurality of the BSSs or IBSSs within a communication coverage range.

In accordance with an embodiment of the present invention, it is an object of the present invention to provide a network clustering device for a wireless mobile communication network and a network clustering method wherein when a single BSS or an IBSS is searched for within a communication coverage range and when a network performance is degraded due to an increase in the number of stations connected to a corresponding BSS or an IBSS, a VBSS (Virtual Basic Service Set) or a VIBSS (Virtual Independent Basic Service Set) in addition to the corresponding BSS or IBSS is independently operated to prevent the degradation of the network performance.

In accordance with an embodiment of the present invention a network clustering device for a wireless mobile communication network and a network clustering method which may serve as an access point when a station is searched for within a communication coverage range.

In accordance with an embodiment of the present invention it is an object of the present invention to provide a network clustering device for a wireless mobile communication network and a network clustering method wherein a power supply unit providing electric power internally is further included to be used for a formation of a network or an urgent recovery or expansion of the network in moving objects such as a vehicle, a ship and an airplane.

In accordance with an embodiment of the present invention it is an object of the present invention to provide a network clustering device for a wireless mobile communication network and a network clustering method which performs the same functions for a wireless mobile communication network using a licensed frequency as those using an unlicensed frequency.

In accordance with an embodiment of the present invention it is an object of the present invention to provide a network clustering device for a wireless mobile communication network and a network clustering method wherein a position locating unit is further included to allow an efficient routing and message relay support through routing based on a position.

In accordance with an embodiment of the present invention it is an object of the present invention to provide a network clustering device for a wireless mobile communication network and a network clustering method wherein proposed communication concepts between a typical station and an access point are expansively applied to a wireless sensor network consisting of sensors acting as the station and a sink node as the access point, and to a relay and a communication between the wireless sensor network and other wireless mobile communication or a wired network.

Technical Solution

In order to achieve the abovementioned object of the invention, there exists a network clustering device for a wireless mobile communication network including at least one access point or stations, the device itself comprising as follows: a plurality of RF transceiver units capable of establishing a plurality of wireless channels with other communication devices in the wireless mobile communication network; a multi-modem unit for processing modulation and demodulation functions in parallel corresponding to the plurality of the RF transceiver units; a network performance measuring unit for measuring network performance regarding to each of the received channel power, received energy, link quality, frame error rate, and channel interference extracting from the plurality of the wireless channels by analyzing received signals of each of the plurality of the wireless channels received from the multi-modem unit; a wireless channel selecting unit for choosing a certain wireless channel from the plurality of the wireless channels, capable of minimizing frequency interferences according to the network performance monitored by the network performance measuring unit; and a central processing unit for transmitting and receiving messages with other communication devices in a network, routing messages between other network clustering devices in the network, and relaying messages to other communication devices in the network, wherein the central processing unit comprises: a multi-communication subunit for communicating with the other communication devices on the wireless mobile communication network by controlling the multi-modem unit; a beacon processing subunit for identifying other communication devices on the wireless mobile communication network, and transmitting and receiving a beacon signal for maintaining a synchronization between the communication devices; a routing processing subunit for performing an exchange of routing and forwarding information between the network clustering devices and for performing a routing process; a relay processing subunit for transferring messages between access points.

In order to achieve the above objects of the invention, there is provided a wireless mobile communication network clustering method using the network clustering device, the method comprising steps of: when the network clustering device searches for other network clustering devices within communication coverage, performing message routing by exchanging routing and forwarding information with other network clustering devices; (b) when the network clustering device searches for a plurality of BSSs within the communication coverage, performing a relay between the plurality of the BSSs by exchanging the routing and forwarding information with an access point included in the plurality of the BSSs; (c) when the network clustering device searches for a single BSS within the communication coverage, and when a network performance measurement value obtained by measuring network performance of the single BSS exceeds a performance threshold value, thereby forming a VBSS by dividing the single BSS and serving as an access point accommodating a portion of stations included in the single BSS; and (d) when the network clustering device searches for stations within the communication coverage, serving as an access point accommodating the stations.

Advantageous Effects

As described above, in accordance with the network clustering device for wireless mobile communication network and the network clustering method of the present invention, a plurality of the wireless mobile communication networks are integrated through the message routing function among the network clustering devices, thereby expanding a size of the network, enhancing an expandability of the wireless mobile communication network through a message relay between partitioned BSSs or IBSSs, and preventing the degradation of the network performance by partitioning the wireless mobile communication networks with the degraded network performance into VBSS or VIBSS due to an excessive connection of stations.

In accordance with an embodiment of the present invention, the position locating unit enables to provide an efficient routing by integrating a physical location.

In accordance with another embodiment of the present invention, an effective network maintenance is provided by an expansion or a partitioning of the wireless sensor network and a fusion of the wireless sensor network with the wireless mobile communication network using the network clustering device.

BEST MODE FOR CARRYING OUT THE INVENTION

Figure 1:
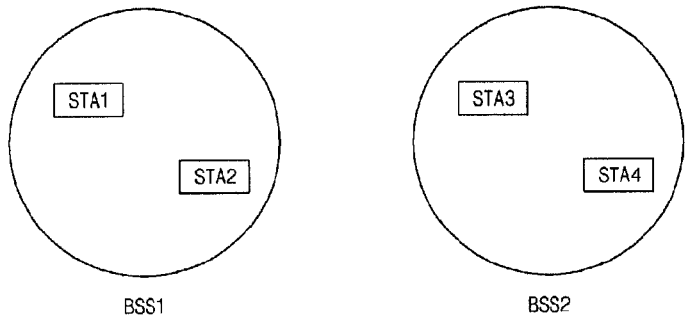
FIG. 1 is a network configuration diagram illustrating a BSS (Basic Service Set).
Figure 2:
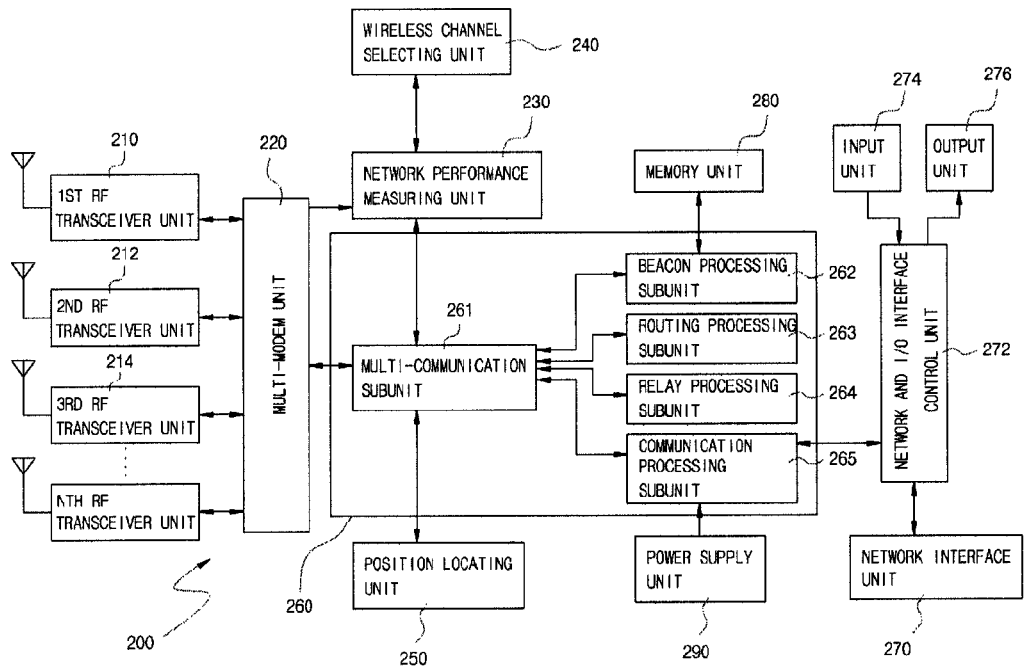
FIG. 2 is a configuration diagram illustrating a network clustering device in accordance with an embodiment of the present invention.

FIG. 2 is a configuration diagram illustrating a network clustering device in accordance with an embodiment of the present invention. The network clustering device 200 in accordance with the present invention is used for a wireless mobile communication network including at least one access point or a station, and comprises a plurality of RF transceiver units 210, 212 and 214, a multi-modem unit 220, a network performance measuring unit 230, a wireless channel selecting unit 240 and a central processing unit 260. As shown, the RF transceiver units 210, 212 and 214 comprises a plurality of modules, and each of the modules supports transmission and reception of a wireless signal. Each of the RF transceiver units are connected to an antenna to perform a function of forming a plurality of wireless channels with other communication devices in a wireless mobile communication network, for example an access point or a station.

The multi-modem unit 220 processes modulation and demodulation functions in parallel corresponding to the plurality of the RF transceiver units 210, 212 and 214.

The network performance measuring unit 230 measures performance for each of the wireless channels by monitoring outbound power, receiving energy, link quality, frame error rate, and frequency interference from each channel of the plurality of the wireless channels received from the multi-modem unit 220. Specifically, the network performance measuring unit 230 respectively measures an output power for each corresponding channel received from a physical layer and a wireless air interface occupation rate, a frame error rate due to a collision in a data link layer, a variation in terms of link quality and transfer data rate, a variation in a packet transfer rate in a network layer and a fluctuation rate of routing and forwarding information, and a throughput of the corresponding network in a transport layer, thereby using a weighted measurement metric calculated from the overall measured results from each of the layers.

The wireless channel selecting unit 240 performs a function of selecting the wireless channel which minimizes frequency interference according to network status measured by the network performance measuring unit 230.

The central processing unit 260 performs a wireless message transmitting and receiving function with other communication devices, a wireless message routing function between other network clustering devices, and a wireless message relaying function between the other communication devices. In order to carry out these functions, the central processing unit 260 comprises a multi-communication subunit 261, a beacon processing subunit 262, a routing processing subunit 263, a relay processing subunit 264, and a communication processing subunit 265.

The multi-communication subunit 261 carries out a communication with the communication devices in the wireless mobile communication network by controlling the multi-modem unit 220, the beacon processing subunit 262 identifies the communication devices in the wireless mobile communication network and exchanges beacon signals for synchronization between communication devices.

The routing processing subunit 263 performs an exchange of routing and forwarding information between the network clustering devices and also performs routing computation process. The relaying processing subunit 264 performs message relaying between the communication devices.

Preferably, the central processing unit 260 may further comprises a position locating unit 250. In accordance with such embodiment, the position locating unit 250 locates a position of the network clustering device based on a wireless signal received from a neighboring network clustering device or a station or using a GPS satellite signal in order to locate the position of the network clustering device 200 for the containment of position information in the case of routing or relaying, thereby providing an effect of more efficient data communication by carrying out the routing and relaying based on the current position of the network clustering device.

More preferably, the network clustering device 200 further comprises a network interface unit 270 in order to connect the wireless mobile communication network to which the network clustering device 200 belongs to a wired network. The network interface unit 270 provides an interface, for example, an Ethernet port RJ-45, to give a connection between the network clustering device 200 and the wired network. In such a case, the central processing unit 260 further comprises a communication processing subunit 265 for relaying communication between the wired network and a communication device in the wireless mobile communication network.

Preferably, an input unit 274 and an output unit 276 allows the network clustering device 200 to be connected to peripherals such as an external keyboard, a printer, a monitor and a disk storage device through interfaces such as an USB, an IEEE 1394 (FireWire), a flash memory card slot so that the network clustering device 200 may be used as a printer server or a file server.

A memory unit 280 provides memory space necessary for processing a communication process of the central processing unit 260.

Generally, a power supply unit 290 is configured to be connected to an external power supply which provides a common power supply of AC 110-220 V. However, it is preferable that the power supply unit 290 is configured to be operating by an additional AC-to-DC converter of −12/24 V or a portable battery so as to be used for an urgent recovery or expansion of the network or in moving objects such as a vehicle, a ship, and an airplane.

MODE FOR THE INVENTION

Figure 3:
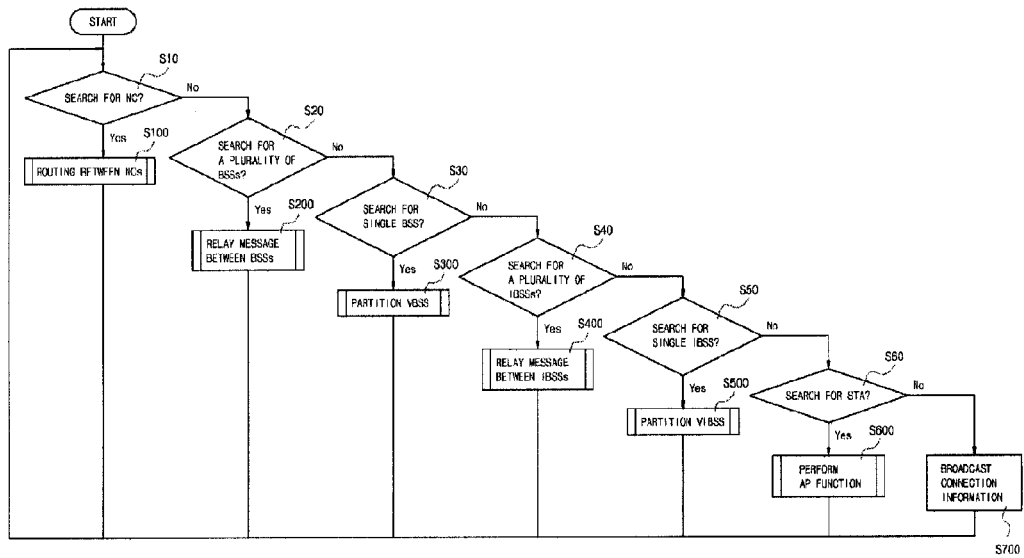
FIG. 3 is a flow chart illustrating a network clustering method in accordance with an embodiment of the present invention.

An operation of the network clustering device 200 in accordance with an embodiment of the present invention in the network will be described in detail with reference to FIG. 3. Firstly, when a network clustering device 200 is searched for other network clustering device within communication coverage (S10), routing and forwarding information is exchanged with the other network clustering device 200 to carry out a message routing (S100).

Thereafter, when a plurality of BSSs within the communication coverage are searched (S20), the routing and forwarding information is exchanged with an access point included in the plurality of the BSSs to carry out a message relay between the plurality of the BSSs (S200).

Next, when a single BSS within the communication coverage is searched (S30), and when a network performance of the BSS network exceeds a performance threshold value, a VBSS being partitioned by the single BSS is formed to serve as the access point accommodating a portion of stations included in the single BSS (S300).

Preferably, when a plurality of IBSSs within the communication coverage are searched (S40), a message relay between the plurality of the IBSSs may further be carried out by exchanging the routing and forwarding information with stations included in the plurality of the IBSSs (S400).

Thereafter, when a single IBSS within the communication coverage is searched (S50), and when the value of the network performance of the IBSS network exceeds the threshold value, a VIBSS being split by the single IBSS is formed to serve as a leader station accommodating a portion of stations included in the single IBSS (S500). Here, a name of the leader station providing a relaying function between divided VIBSSs is given to classify a station used in a general meaning.

Next, when a station within the communication coverage is searched (S60), the network clustering device 200 serves as an access point accommodating the stations.

Figure 4:
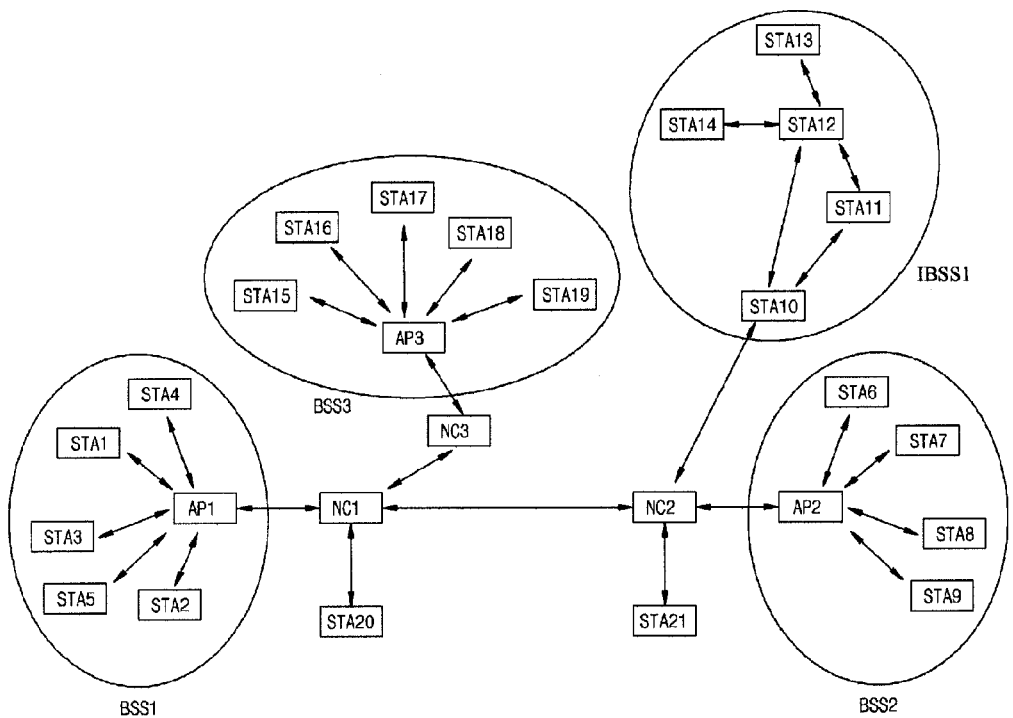
FIG. 4 is a network configuration diagram illustrating a wireless mobile communication network expanded by a routing between a plurality of network clustering devices in accordance with an embodiment of the present invention.

A respective operation will be described in detail in the following with reference to FIGS. 4 through 16. When a plurality of network clustering devices NC1, NC2 and NC3 are respectively connected to an individual BSS or an IBSS as shown in FIG. 4, a direct communication between stations STA1 and STAT belonging to different BSS or IBSS is not possible in general. However, when a direct message routing is possible among the network clustering devices NC1, NC2 and NC3 in accordance with the present invention, a direct communication between different networks is also possible so that a range of the network is remarkably increased.

The beacon processing subunit 262 of the network clustering device NC1 searches for the second and the third network clustering devices NC2 and NC3, the multi-communication subunit 261 receives connection information of the at least one station STA6 through STA19 connected to the access points AP2 and AP3 after the multi-communication subunit 261 carries out an authentication and a connection between the at least one access point AP2 and AP3 in BSSs BSS2 and BSS3 or the station STA10 in an IBSS IBSS1.

The routing processing subunit 263 combines connection information of the stations STA6 through STA19 received from the network clustering devices NC2 and NC3 with connection information of the stations STA1 through STA5 to generate a network topology and the routing and forwarding information so as to carry out routing among the network clustering devices NC1, NC2 and NC3.

Figure 5:
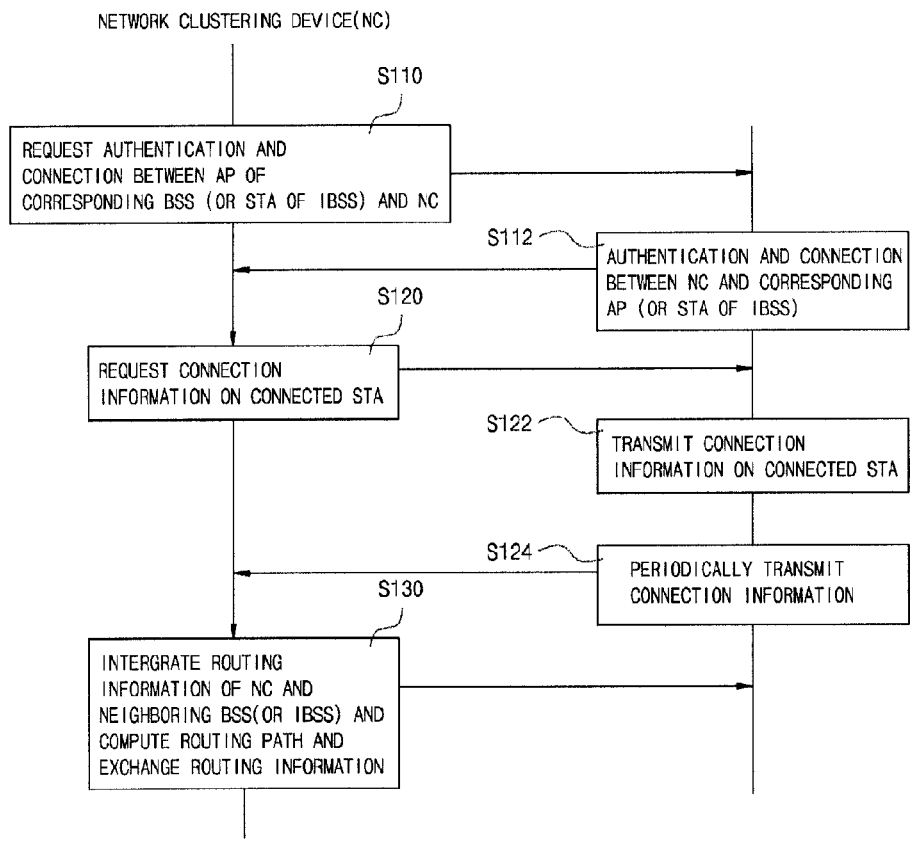
FIG. 5 is a flow chart illustrating a routing method between a plurality of network clustering devices.

FIG. 5 illustrates a routing process wherein the network clustering device NC1 in accordance with the present invention searches for the neighboring network clustering devices NC2 and NC3 to perform routing. First, the network clustering device NC1 performs an authentication by connecting to the access points AP2 and AP3 or the station STA10 via the network clustering devices NC2 and NC3 within the communication coverage range (S110, S112).

Thereafter, the network clustering device NC1 periodically receives connection information including a corresponding identification of the access point or the station currently connected to the network clustering device (S122, S124) by requesting the connection information from the access points AP2 and AP3 or the station STA10 (S120). The connection information is configured to include the corresponding identification of the access point or the station currently connected to the network clustering device and the corresponding identification of a station directly or indirectly connected to the network clustering device.

Next, the network clustering device NC1 updates the routing and forwarding information by analyzing the received connection information, and performs a routing function among the plurality of the network clustering devices NC1, NC2 and NC3 by exchanging the updated routing and forwarding information with the network clustering devices NC2 and NC3 (S130).

A communication between isolated BSSs BSS1, BSS2 and BSS3 and IBSS IBSS1 is possible as shown in FIG. 4 due to the routing between the network clustering devices. As a result, a public wireless LAN service for a device utilizing the unlicensed frequency is also possible, thereby providing an effect of supporting an expansion of the network coverage. On the other hand, the network clustering devices NC1, NC2 and NC3 accommodate STA STA20 and STA21 which are positioned within the communication coverage as well as connect BSS or IBSS, thereby providing the hosting function as an access point of STA which is out of wireless mobile communication network coverage as well as the routing function.

Figure 6:
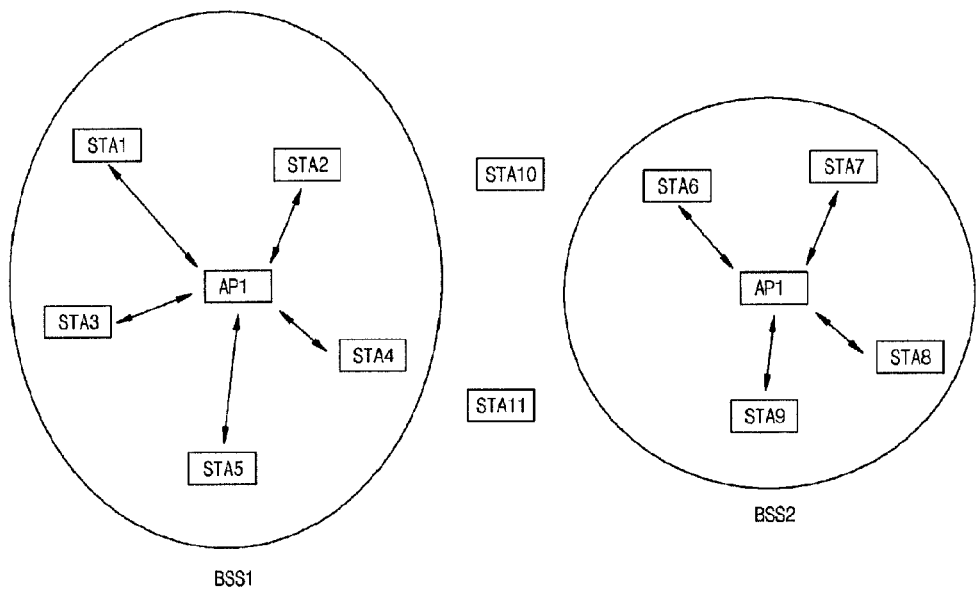
FIG. 6 is a network configuration diagram illustrating a plurality of BSSs spaced apart from one another.
Figure 7:
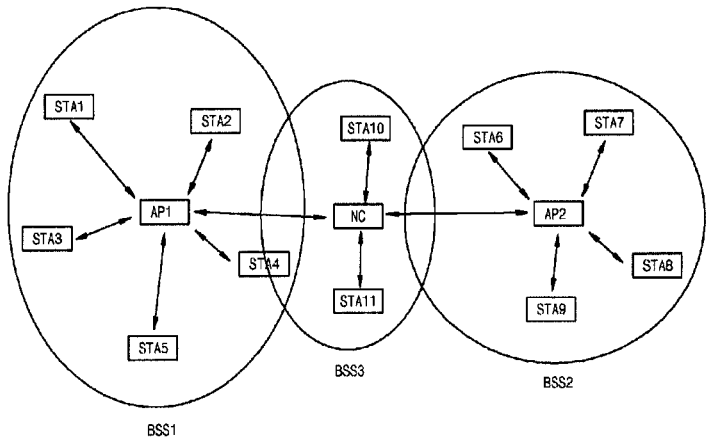
FIG. 7 is a network configuration diagram illustrating a message relay between a plurality of BSSs spaced apart from one another using a network clustering device in accordance with an embodiment of the present invention.

FIG. 6 illustrates isolated two BSSs wherein a communication is not possible between them. Since a first access point AP1 and a second access point AP2 are isolated from each other and unable to communicate, stations STA1 through STA5 belonged to a BSS1 and stations STA6 through STA9 belonged to a BSS2 cannot communicate with each other. In addition, stations STA10 and STA11 which are not belonged to BSS1 and BSS2 cannot connect to a wireless mobile communication network. However, when a network clustering device NC in accordance with the present invention is installed in a proper position as shown in FIG. 7, the stations STA1 through STA5 belonged to the BSS1 are able to directly communicate with the stations STA6 through STA9 belonged to the BSS2 because the network clustering device NC performs a function of relaying a message between the respective access points AP1 and AP2. Therefore, an effect of expanding a range of wireless mobile communication network is provided. In addition, since the network clustering device NC serves as the access point and does not belong to the specific BSS, a new BSS BSS3 accommodating the station STA 10 and STA 11 in the shadow region where the wireless mobile communication network cannot be used is self-organized to also extend a physical range of the wireless mobile communication network.

A description of an operation of the network clustering device 200 is as follows. When the beacon processing subunit 262 searches for a plurality of BSSs BSS1 and BSS2 within the communication coverage, the multi-communication sub-unit 261 transmits a routing and forwarding information request message to access points AP1 and AP2 of the plurality of the BSSs BSS1 and BSS2, thereby receiving the routing and forwarding information of the BSSs BSS1 and BSS2, respectively.

The wireless channel selecting unit 240 determines the channel to be used for each of the plurality of the BSSs BSS1 and BSS2 and the RF transceiver units from the plurality of the RF transceiver units 210, 212, and 214 to be used, based on the routing and forwarding information received from the access points AP1 and AP2. The multi-communication sub-unit 261 transmits control information including information with the channel to be used for each of the plurality of the BSSs BSS1 and BSS2 and the RF transceiver units to be used, an output power for each of the channel to be used, and a data transfer rate of each of the channel to be used to the access points AP1 and AP2 of the plurality of the BSSs BSS1 and BSS2.

Thereafter, the relay processing subunit 264 processes message relaying between the access points AP1 and AP2 of the plurality of the BSSs BSS1 and BSS2, based on the routing and forwarding information from each of the plurality of the BSSs BSS1 and BSS2 and the synchronized control information.

Figure 8:
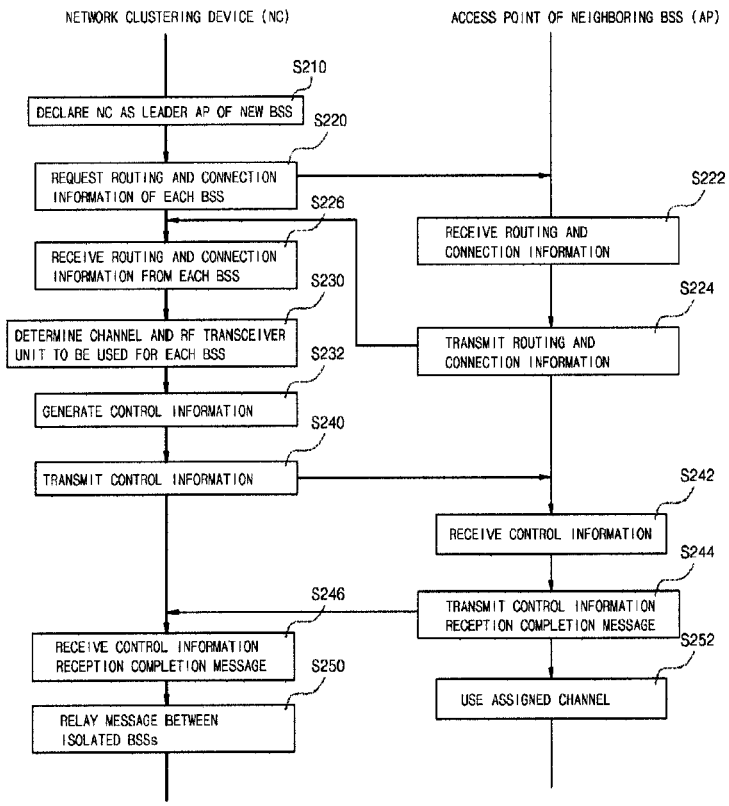
FIG. 8 is a flow chart illustrating a message relaying method between a plurality of BSSs spaced apart from one another using a network clustering device in accordance with an embodiment of the present invention.

FIG. 8 illustrates a message relay process between the plurality of the BSSs BSS1 and BSS2 in accordance with the present invention. Firstly, the network clustering device NC generates a new BSS BSS3 as a leader access point (S210). As a result, the stations STA10 and STA11 in a position of the shadow area as shown in FIG. 6 enable to connect to the wireless mobile communication network using the network clustering device NC as the access point.

Thereafter, the network clustering device NC receives the routing and forwarding information (S222, S224, S226) by requesting the same information (S220) to neighboring access points AP1 and AP2 of the plurality of the BSSs BSS1 and BSS2.

Next, the network clustering device NC determines a channel and an RF transceiver unit of the plurality of the RF transceiver units 210, 212, and 214 to be used, based on the routing and forwarding information received from the access points AP1 and AP2 per each of the plurality of the BSSs BSS1 and BSS2, and generates control information including an output power for each of the channels to be used and a data transfer rate for each of the channels (S230 and S232).

Thereafter, the network clustering device NC transmits the control information to the access points AP1 and AP2 of the plurality of the BSSs BSS1 and BSS2 (S240, S242, S244 and S246).

Finally, the network clustering device NC performs message relaying between the plurality of the BSSs BSS1 and BSS2 (S250 and S252).

Figure 9:
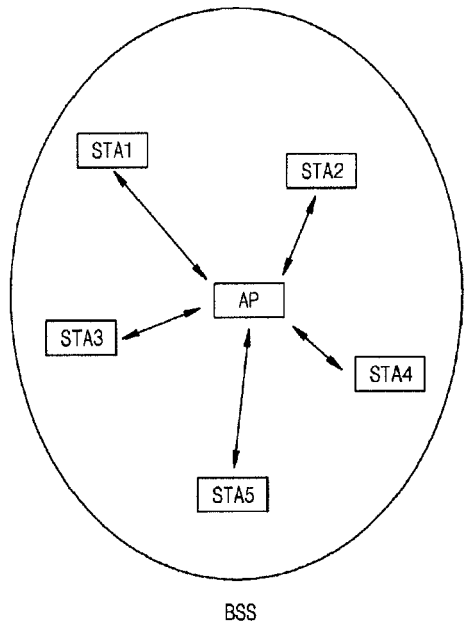
FIG. 9 is a network configuration diagram illustrating a BSS having an excessive number of stations connected thereto.
Figure 10:
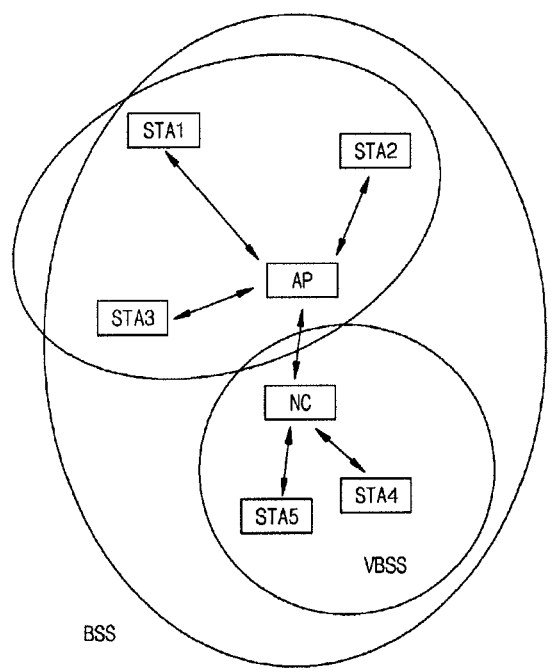
FIG. 10 is a network configuration diagram illustrating a division of a BSS into VBSSs in accordance with an embodiment of the present invention.

FIGS. 9 and 10 are network configuration diagrams illustrating dividing a single BSS into a BSS and a VBSS (Virtual BSS) using the network clustering device 200 in accordance with the present invention. When the number of stations STA1 through STA5 connected to a single BSS network is increased, a communication message and a control message RTS, CTS and ACK between the station and the access point AP are also increased. As a result, a network efficiency of the corresponding BSS is degraded. In order to prevent such degradation of the network efficiency, the network clustering device NC in accordance with the present invention is employing a method using a new channel which does not generate an interference with the frequency currently used in the same BSS and controlling a proper output power and a data rate between each channel frequency, thereby enabling to split the wireless mobile communication network with an excessive amount of communication overheads.

The wireless mobile communication network newly generated by the network clustering device NC adaptively divides the corresponding network according to an operating situation of the network. In such a case, although routing and forwarding tables of the network are updated according to a change of the physical network topology, existing connection states are logically maintained so that the term "virtual" is used.

A partitioning of the virtual network VBSS by the network clustering device 200 is described in detail in the following. When the beacon processing subunit 262 searches for a single BSS within the communication coverage, the network performance measuring unit 230 measures performance of the BSS network to determine whether the performance of the BSS network exceeds a threshold value or not. When the performance is below the threshold value, the network clustering device 200 is acting as regular stations STA1 through STA5. When the performance of the network exceeds the threshold value according to a measured result of the network performance measuring unit 230, a division of network is attempted to enhance the network efficiency.

Thereafter, the network clustering device NC declares itself as a leader access point of a VBSS, the multi-communication subunit 261 transmits a request message for routing and forwarding to the access point AP of the BSS to receive the routing and forwarding information, the wireless channel selecting unit 240 determines the channel to be used for the VBSS and the RF transceiver unit to be used based on the routing and forwarding information, and the multi-communication subunit 261 transmits control information containing information on the channel to be used for the BSS and the RF transceiver unit to be used, an output power for each of the channel to be used and a data transfer rate of each of the channel to be used to the stations STA1 through STA5 of the BSS via the access point AP of the BSS.

Finally, the multi-communication subunit 261 performs communication with the stations STA4 and STA5 of the VBSS as an access point of the VBSS.

Figure 11:
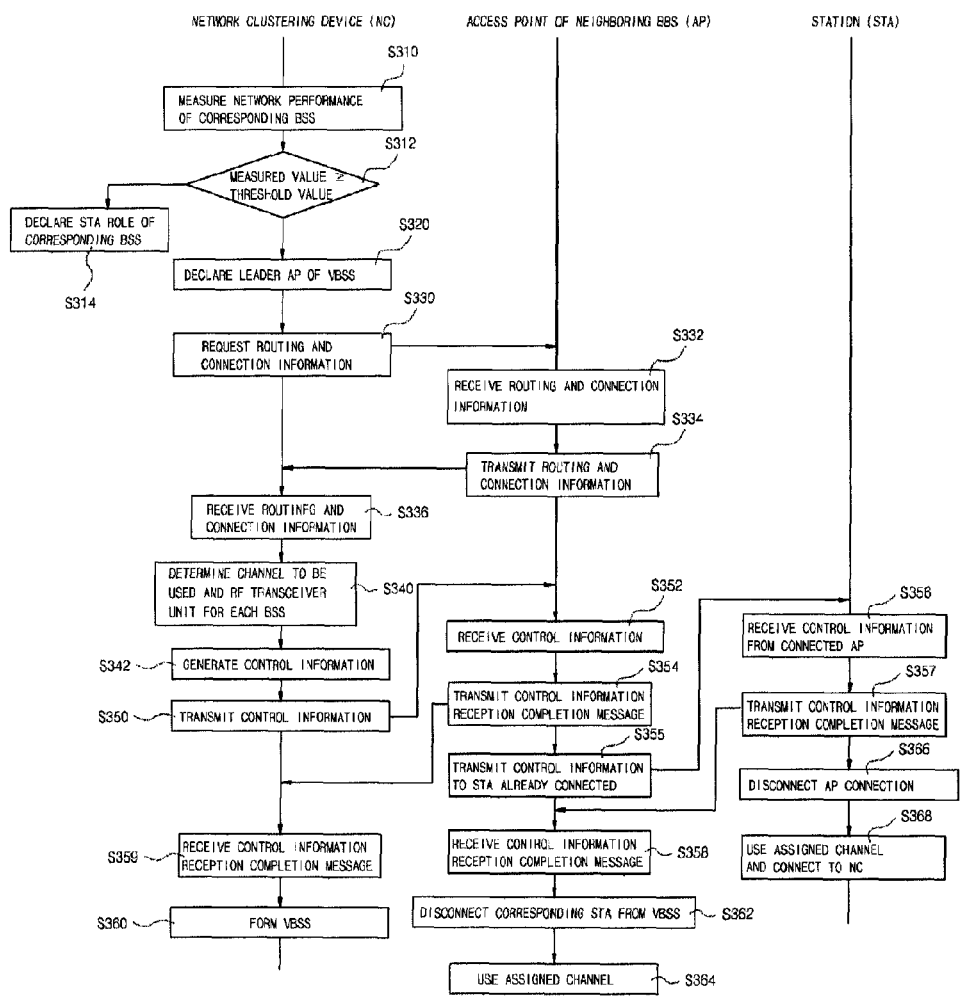
FIG. 11 is a flow chart illustrating a method for partitioning a BSS into VBSSs in accordance with an embodiment of the present invention.

FIG. 11 illustrates a BSS partitioning process by the network clustering device in accordance with an embodiment of the present invention. First, the network clustering device NC measures performance of the wireless mobile communication network of the BSS (S310) to determine that the performance exceeds a threshold value (S312). When the performance does not exceed the threshold value, the network clustering device 200 is serving as a regular station (314). When the performance exceeds the threshold value, the network clustering device NC declares itself as a leader access point of a VBSS (S320). The leader access point acting as an access point which provides a mutually relaying function between divided VBSSs is referred to as "leader access point," thereby distinguishing it from a regular access point.

Thereafter, the network clustering device NC requests routing and forwarding information to the access point AP of the BSS (S330) to receive the routing and forwarding information (S332, S334 and S336). Next, the network clustering device NC determines the channel to be used for the BSS and the VBSS and the RF transceiver unit to be used based on the routing and forwarding information (S340), and generates control information including an output power for each of the channel to be used and a data transfer rate of each of the channel to be used (S342).

Thereafter, the network clustering device NC transmits the generated control information to the stations STA1 through STA5 of the BSS via the access point AP of the BSS (S350, S352, S354, S355, S356, S357, S358 and S359). Finally, a portion of the stations STA4 and STA5 of the BSS forms a VBSS divided from the existing BSS by connecting to the network clustering device NC as their access point (S360, S362, S364, S366 and S368).

Figure 12:
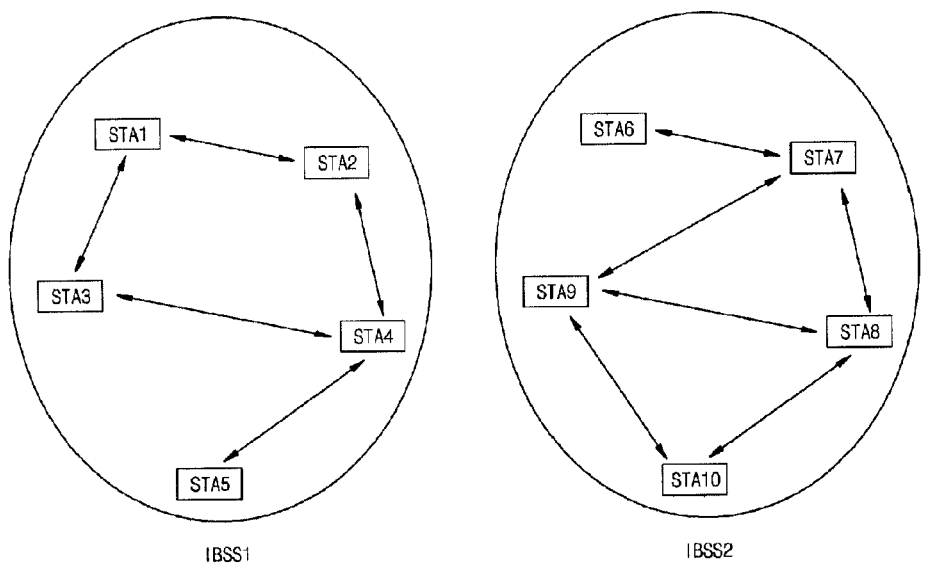
FIG. 12 is a network configuration diagram illustrating a plurality of IBSSs spaced apart from one another.
Figure 13:
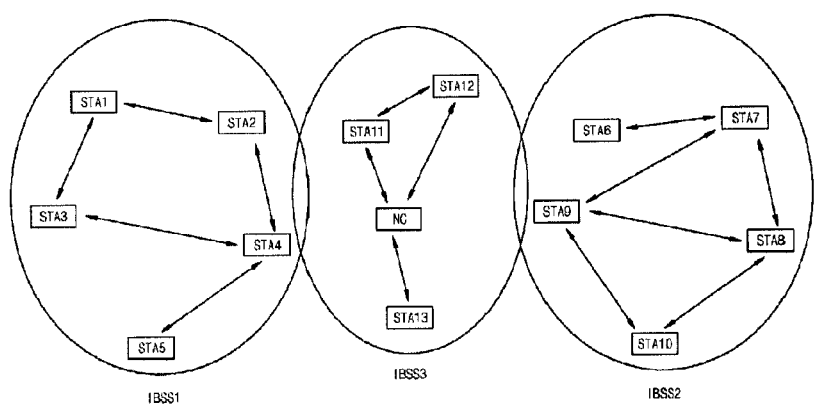
FIG. 13 is a network configuration diagram illustrating a message relay between a plurality of IBSSs spaced apart from one another using a network clustering device in accordance with an embodiment of the present invention.

In the case of an IBSS wherein the station directly relays communication between stations and participates in communication in itself contrary to the BSS wherein the station performs centralized communication centered on the access point, the access point in accordance with present invention may be applied in the same manner. For example, as shown in FIG. 12, when a plurality of IBSSs IBSS1 and IBSS2 isolated from each other exists, communication between IBSSs may be mediated using the network clustering device NC as shown in FIG. 13. In such a case, the network clustering device NC may form an IBSS IBSS3 or a BSS network in itself in the same manner as the BSS.

Figure 14:
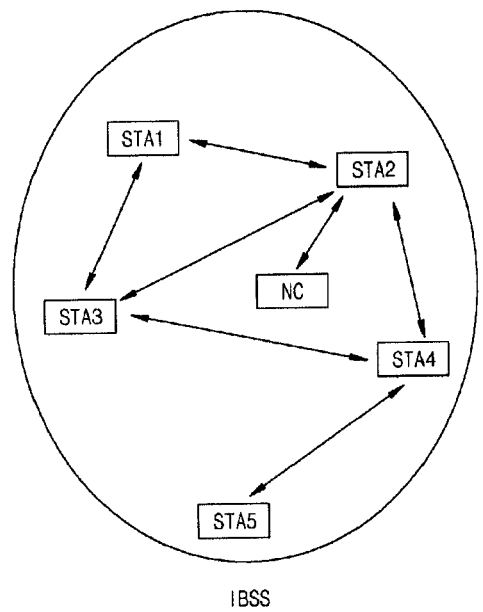
FIG. 14 is a network configuration diagram illustrating an IBSS having an excessive number of stations connected thereto.
Figure 15:
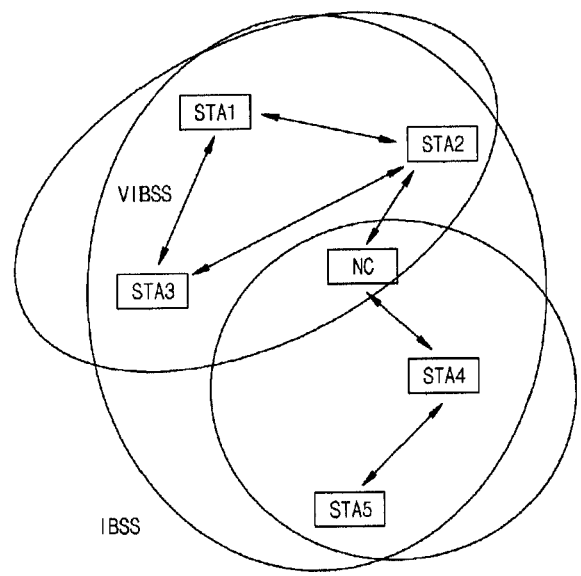
FIG. 15 is a network configuration diagram illustrating a partitioning of an IBSS into VIBSSs in accordance with an embodiment of the present invention.

With respect to a network partition, when the number of stations STA1 through STA5 connected to the IBSS network is increased as shown in FIG. 14, the IBSS may be partitioned into a virtual IBSS (VIBSS) by mediating through the network clustering device.

Since message relaying between the IBSSs and the partitioning of the IBSS into the VIBSS by the network clustering device NC are the same as in the case of the BSS respectively except that the routing and forwarding information is directly received from the station not from the access point and that the control information is also directly transmitted to the station without mediating through the access point, a description in detail is omitted.

Finally, when the network clustering device NC in accordance with the present invention cannot search the BSS, IBSS and the network clustering device but is only able to search the station, the network clustering device NC serves as a regular access point. That is, when there does not exist any other wireless mobile communication network to connect, a new BSS by having the network clustering device as a center of the network is formed.

An operation of the access point of the network clustering device NC will be described in the following. When the beacon processing subunit 262 searches for the station within a communication coverage, the wireless channel selecting unit 240 selects a channel to be used and the RF transceiver unit to be used, and the multi-communication subunit 261 transmits control information containing information on the channel to be used and the RF transceiver unit to be used, an output power for the channel to be used and a data transfer rate of the channel to be used to an entire station within the communication coverage, thereby enabling to communicate with the station within the communication coverage.

Figure 16:
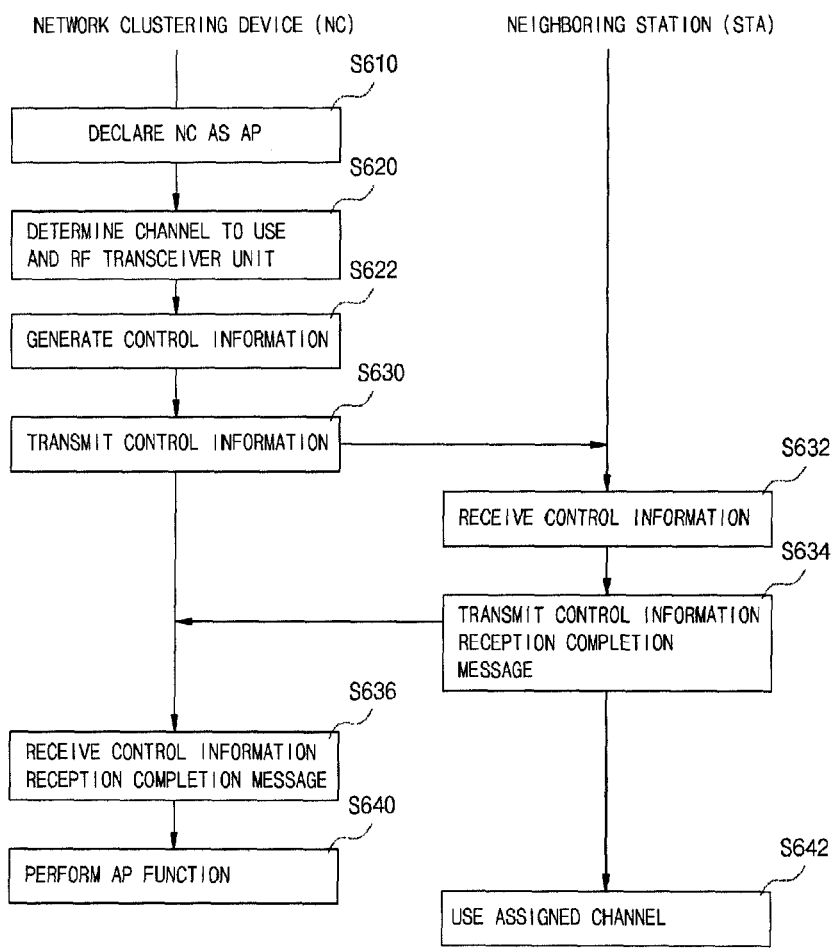
FIG. 16 is a flow chart illustrating a method for using a network clustering device as an access point in accordance with an embodiment of the present invention.

FIG. 16 illustrates an operation of the network clustering device acting as the access point in accordance with an embodiment of the present invention. Firstly, the network clustering device 200 declares itself as the access point (S610). Thereafter, the network clustering device 200 determines an arbitrary non-interference channel to be used and an RF transceiver unit to be used (S620) and generates control information including an output power for each of the channels and a data transfer rate of each of the channels (S622).

Next, the network clustering device 200 transmits the generated control information to the station (S630, S632, S634 and S636). Finally, the station within the communication coverage connects to the network clustering device 200 as its access point (S640 and S642).

On the other hand, the network clustering device in accordance with the present invention may be applied to a wireless sensor network or called as a ubiquitous sensor network as well as a general wireless mobile communication network. The wireless sensor network is a network wherein a plurality of sensors are arranged in a dispersive manner to be formed a network and various data sensed by the sensors are wirelessly collected and processed to be transmitted to an administrator. The wireless sensor network, compared to the general wireless mobile communication network, (i) has a self-organizing ability, (ii) has a characteristic of a short distance broadcast and a multi-hop routing, (iii) has a densely deployed sensor nodes, (iv) performs a cooperative effort among the sensor nodes, (v) has a rapidly changing topology by radio wave fading and a sensor node failure, and (vi) has a limited available energy, output transmission power, memory and computing capacity.

An RFID technology widely used in recent days is a wireless technology wherein an RFID (Radio Frequency IDentification) tag is attached to an object to be managed in a similar manner as a conventional barcode to manage various matters such as a movement of the object and a position retrieval through an RFID reader, and may be regarded as a type of a BSS network including the RFID Tag corresponding to a station of a conventional wireless LAN and the RFID reader corresponding to an access point. However, in the case of the RFID, since mutual communication between RFID tags are not possible, it is regarded as a sort of a network based on a conventional wireless network infrastructure.

Figure 17:
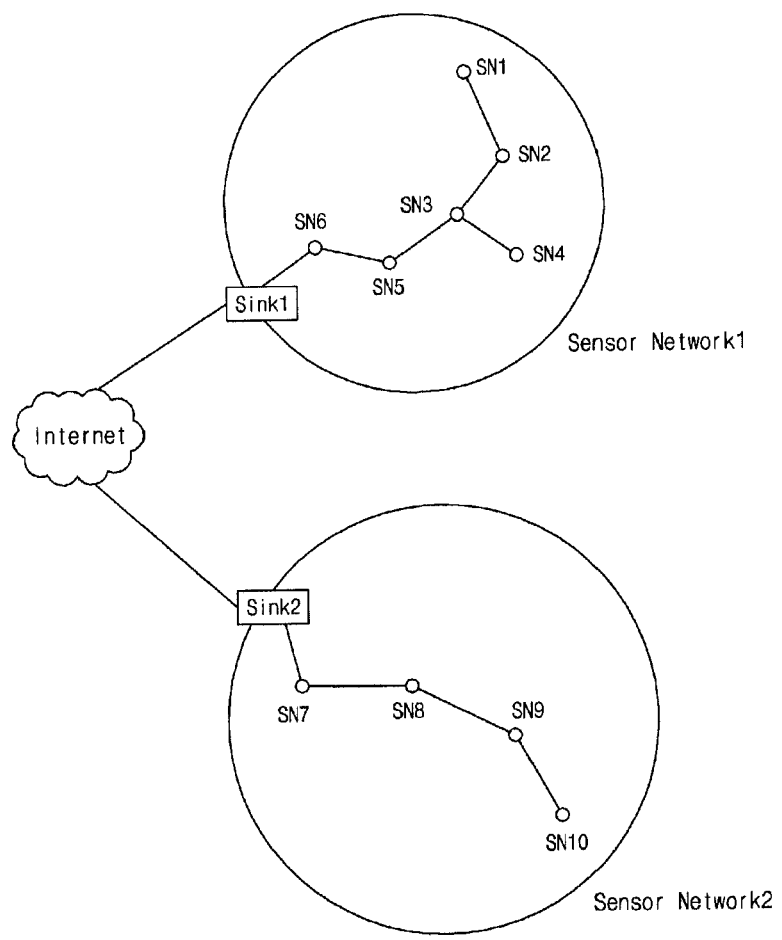
FIG. 17 is a network configuration diagram illustrating a general wireless sensor network.

FIG. 17 illustrates a general wireless sensor network. The wireless sensor networks Sensor Network1 and 2 comprise a plurality of sensor nodes and a sink or a coordinator (a term defined in IEEE 802.15.4, LR-WPAN (Low Rate Wireless Personal Area Network, so-called ZigBee standard). Each of the sensor nodes SN1-SN10 includes a sensor, a processor and a memory so to process information sensed in a specific region where a corresponding node is deployed, and the sinks Sink 1 and 2 serve as gateways for relaying the wireless sensor networks Sensor Network1 and 2 to the Internet or other network infrastructure. Information sensed at the sensor node SN1 positioned at an end is sequentially transmitted through the neighboring sensor nodes SN2, SN3, SN5 and SN6 to be relayed through the sink Sink1 to the other networks such as the Internet.

Figure 18:
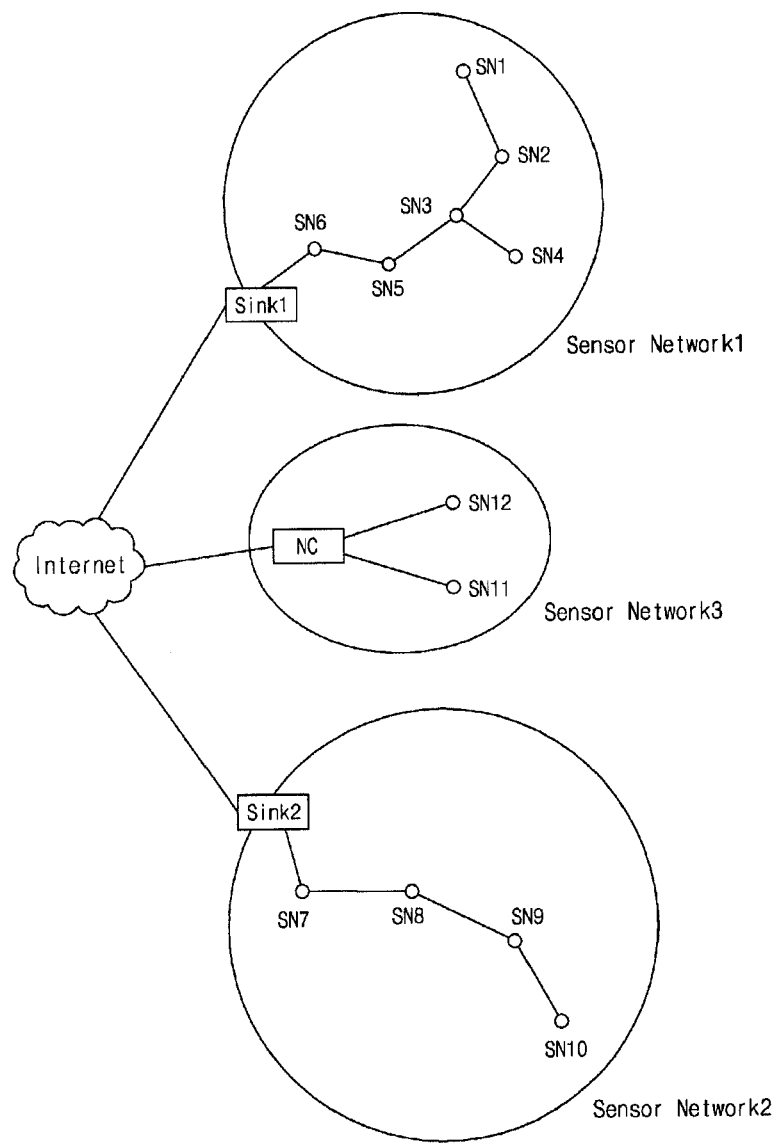
FIG. 18 is a network configuration diagram illustrating a first usage example of network clustering device in accordance with an embodiment of the present invention.

FIG. 18 illustrates an example wherein the network clustering device NC in accordance with the present invention is applied to a message relaying between isolated sensor networks Sensor Network 1 and 2. Since the network clustering device NC comprises a plurality of the RF transceiver units 210, 212 and 214 and a multi-modem unit 220 so as to be capable of communicating with the sensor nodes SN1-SN10, and of relaying a message or a data among the sink nodes Sink1, Sink2 through the relay processing subunit 264 of the central processing unit 260, the network clustering device NC provides an effect of expanding a sensing area of the wireless sensor networks Sensor Network 1 and 2 in the same manner as the expansion of the communication area in the wireless mobile communication network. In addition, the network clustering device NC in accordance with the present invention acts as the sink node in the wireless sensor network identical to the function of the access point in the wireless mobile communication network so that a new wireless sensor network Sensor Network3 is forming by the network clustering device NC acting as a network center and is providing a hosting function for sensor nodes SN11 and SN12, thereby providing an effect of physical expansion of the wireless sensor network.

Figure 19:
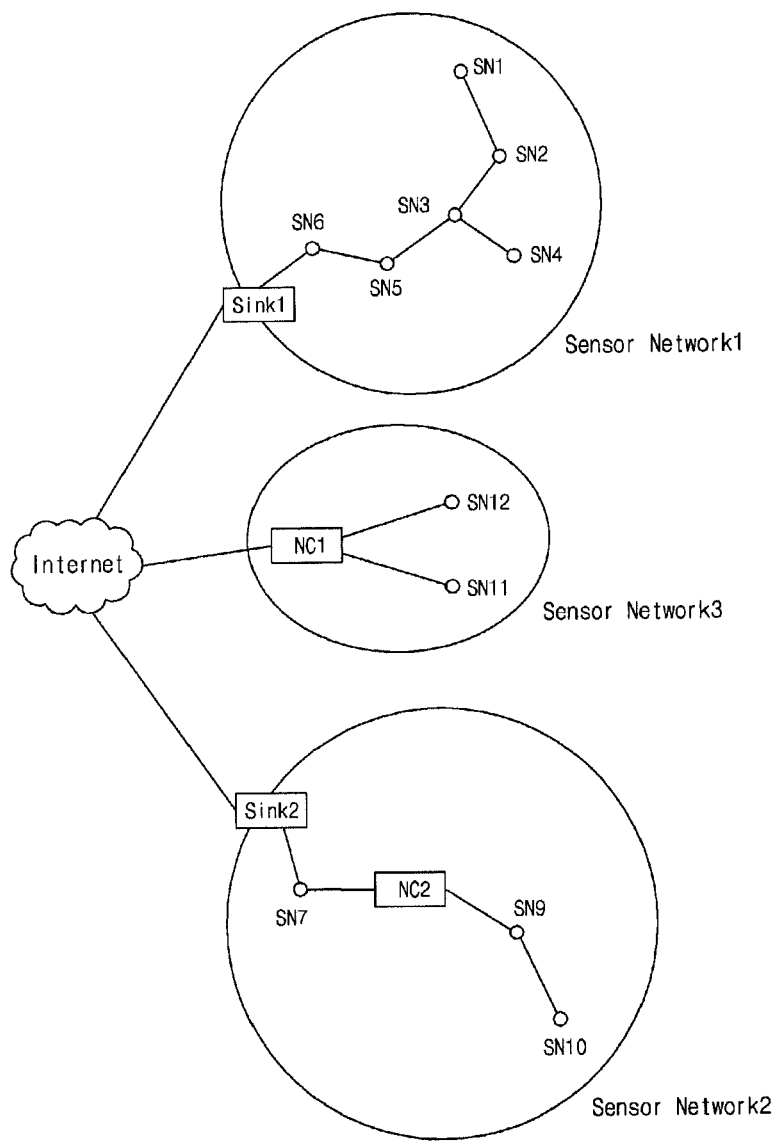
FIG. 19 is a network configuration diagram illustrating a second usage example of network clustering device in accordance with an embodiment of the present invention.

FIG. 19 illustrates an example wherein the second network clustering device NC2 in accordance with the present invention serves as a relay means between sensor nodes SN. The second network clustering device NC2 performs a role of relaying a message between the sensor nodes SN9 and SN7 within the sensor network Sensor Network2. Since a capacity of internal power supply is limited due to miniaturized characteristic of the sensor node, the sensor nodes SN6 and SN7 disposed adjacent to the sink nodes Sink1 and Sink2 in particular have a large power consumption because the sensor nodes SN6 and SN7 must relay the entire sensing messages from the sensor nodes SN1-SN5 and SN8-SN10 to the sink nodes Sink1 and Sink2 as well as their own sensing messages. Therefore, in the case of a power shortage of the sensor nodes SN6 and SN7 disposed adjacent to the sink nodes Sink1 and Sink2, the entire wireless sensor network may happen not to be operating. However, when the network clustering devices NC1 and NC2 are used as the sensing nodes, such problem may be prevented.

In addition, in the case of the wireless sensor network, similar to the wireless mobile communication network, the network clustering device NC may be used to perform a routing function among the network clustering devices, a message relay function between the network clustering device and an independent network, a function of network partitioning, a function of an access point (sink node) with respect to a station (sensor node) isolated from the network, and a function of a station (sensor node) within the network. Therefore, by using the network clustering device 200 in the wireless sensor network, a fusion of a common wireless mobile communication network and a wireless sensor network, and an effective network maintenance and repair through an expansion or a partitioning of the network with respect to the wireless sensor network are provided.

INDUSTRIAL APPLICABILITY

As described above, in accordance with the network clustering device for wireless mobile communication network and the network clustering method of the present invention, a plurality of the wireless mobile communication networks are integrated through the message routing function among the network clustering devices, thereby expanding a size of the network, enhancing an expandability of the wireless mobile communication network through a message relay between partitioned BSSs or IBSSs, and preventing the degradation of the network performance by partitioning the wireless mobile communication networks with the degraded network performance into VBSS or VIBSS due to an excessive connection of stations.

In accordance with an embodiment of the present invention, the position locating unit enables to provide an efficient routing by integrating a physical location.

In accordance with another embodiment of the present invention, an effective network maintenance is provided by an expansion or a partitioning of the wireless sensor network and a fusion of the wireless sensor network with the wireless mobile communication network using the network clustering device.

The invention claimed is:
1. A network clustering device for a wireless mobile communication network including at least one access point or a station, the device comprising:

a plurality of RF transceiver units capable of establishing a plurality of wireless channels with a first communication devices in the wireless mobile communication network;

a multi-modem unit for processing modulation and demodulation functions in parallel corresponding to the plurality of the RF transceiver units;

a network performance measuring unit for measuring network performance from the plurality of the wireless channels by analyzing the received signals of each of the plurality of the wireless channels obtained from the multi-modem unit;

a wireless channel selecting unit for choosing a wireless channel from the plurality of the wireless channels, capable of minimizing frequency interferences according to the network performance measured by the network performance measuring unit;

and a central processing unit for transmitting and receiving wireless message with the first communication devices in a network, including a wireless message routing function to a first network clustering devices in the network, a wireless message relaying function to the first communication devices in the network, and a position locating function for locating a position thereof in the network, wherein the central processing unit comprises:

a multi-communication subunit for communicating with the first communication devices in the wireless mobile communication network by controlling the multi-modem unit;

a beacon processing subunit for identifying the first communication devices in the wireless mobile communication network and receiving a beacon signal for a synchronization between the first communication devices;

a routing processing subunit for performing an exchange of routing and forwarding information to the first network clustering devices and for performing a routing process;

a position locating unit for locating a position of the network clustering device; and a relay processing subunit for relaying a message between the at least one access points.

2. The network clustering device in accordance with claim 1, wherein, when the beacon processing subunit searches for a second network clustering devices within a communication coverage, the multi-communication subunit receives a connection information of the at least one stations connected to the access point after the multi-communication subunit carries out an authentication and a connection between the at least one access point or a station in a BSS or an IBSS including the second network clustering device, and wherein the routing processing subunit performs a routing to the second network clustering devices by generating a network topology and the routing and forwarding information using the connection information of the at least one station.

3. The network clustering device in accordance with claim 1, wherein, when the beacon processing subunit searches for a plurality of BSSs within a communication coverage, the multi-communication subunit transmits a routing and forwarding information request message to access points of the plurality of the BSSs to receive the routing and forwarding information and a connection information, wherein the wireless channel selecting unit determines a channel to be used for each of the plurality of the BSSs and an RF transceiver unit to be used based on the routing and forwarding information and the connection information, wherein the multi-communication subunit transmits control information including the channel to be used for each of the plurality of the BSSs and the transceiver unit to be used, an output power for each of the channel to be used and a data transfer rate of each of the channel to be used to the access points of the plurality of the BSSs, and wherein the relay processing subunit processes a message relay between the access points of the plurality of the BSSs.

4. The network clustering device in accordance with claim 1, wherein, when the beacon processing subunit searches for a single BSS within a communication coverage, the network performance measuring unit measures a performance of the BSS of the network to determine that the performance of the BSS of the network exceeds a threshold value, and wherein, when the performance of the BSS network exceeds the threshold value, the network clustering device declares itself as a leader access point of a VBSS, the multi-communication subunit transmits a routing and forwarding information request message to an access point of the BSS to receive the routing and forwarding information and a connection information, the wireless channel selecting unit determines a channel to be used for the VBSS and an RF transceiver unit to be used based on the routing and forwarding information and the connection information, the multi-communication subunit transmits control information including the channel to be used for the BSS and the RF transceiver unit to be used, an output power for each of the channel to be used and a data transfer rate of each of the channel to be used to a station of the BSS via the access point of the BSS, and the multi-communication subunit communicates with a station of the VBSS as an access point of the VBSS.

5. The network clustering device in accordance with claim 1, wherein, when the beacon processing subunit searches for a plurality of IBSSs within a communication coverage, the multi-communication subunit transmits a routing and forwarding information request message to stations of the plurality of the IBSSs to receive the routing and forwarding information and a connection information, wherein the wireless channel selecting unit determines a channel to be used for each of the plurality of the IBSSs and an RF transceiver unit to be used based on the routing and forwarding information and the connection information, wherein the multi-communication subunit transmits control information including the channel to be used for each of the plurality of the IBSSs and the RF transceiver unit to be used, an output power for each of the channel to be used and a data transfer rate of each of the channel to be used to the stations of the plurality of the IBSSs, and wherein the relay processing subunit processes message relaying between the stations of the plurality of the IBSSs.

6. The network clustering device in accordance with claim 1, wherein, when the beacon processing subunit searches for a single IBSS within a communication coverage, the network performance measuring unit measures a performance of the IBSS of the network to determine that the performance of the IBSS network exceed a threshold value, and wherein, when the performance of the IBSS of the network exceeds the threshold value, the network clustering device declares itself as a leader station of a VIBSS, the multi-communication subunit transmits a routing and forwarding information request message to a station of the IBSS to receive the routing and forwarding information and the connection information, the wireless channel selecting unit determines the channel to be used for the VIBSS and the RF transceiver unit to be used based on the routing and forwarding information and the connection information, the multi-communication subunit transmits control information including the channel to be used for the IBSS and the RF transceiver unit to be used, an output power for each of the channel to be used and a data transfer rate of each of the channel to be used to the station of the IBSS, and the multi-communication subunit communicates with a station of the VIBSS as a leader station of the VIBSS.

7. The network clustering device in accordance with claim 1, wherein, when the beacon processing subunit searches for the station within a communication coverage, the wireless channel selecting unit selects a channel to be used and the RF transceiver unit to be used, and the multi-communication subunit transmits control information including the channel to be used and the RF transceiver unit to be used, an output power for the channel to be used and a data transfer rate of the channel to be used to an entire station within the communication coverage range to communicate with the station within the communication coverage range.

8. The network clustering device in accordance with claim 1, wherein, by respectively measuring a power of an output for each corresponding channel received from a physical layer and a wireless air interface usage occupation rate, a frame error rate due to a collision in a data link layer, a variation in a link quality and transfer data rate, a variation in a packet transfer rate in a network layer and a change rate of the routing and forwarding information, and a throughput of a corresponding network in a transport layer, the network performance is calculated by a weighted measurement metric from the overall measured results from each of the layers.

9. The network clustering device in accordance with claim 1, wherein the position locating unit receives a GPS signal from a GPS satellite to determine a physical position of the network clustering device, or receives a signal message exchanged for locating a position between the network clustering devices or the network clustering device and the station to determine the position of the network clustering device, and
wherein the routing processing subunit generates the routing and the forwarding information based on the physical position of the network clustering device by the position locating unit.

10. The network clustering device in accordance with claim 1, wherein the wireless mobile communication network comprises a wireless sensor network, the station comprises a sensor node, and the access point comprises a sink node.

11. The network clustering device in accordance with claim 1, further comprising a network interface unit for providing an interface function between the network clustering device and a wired network; and
wherein the central processing unit further comprises a communication processing subunit for relaying communication between the wired network and the first communication device in the wireless mobile communication network.

12. The network clustering device in accordance with claim 1, wherein the network clustering device further comprises a power supply unit for internally providing a power.

13. A wireless mobile communication network clustering method using a network clustering device, the method comprising steps of:
(a) when the network clustering device searches for a second network clustering devices within a communication coverage, performing a message routing by exchanging routing and forwarding information with the second network clustering device;
(b) when the network clustering device searches for a plurality of BSSs within the communication coverage, performing a relay between the plurality of the BSSs by exchanging the routing and forwarding information with an access point included in the plurality of the BSSs;
(c) when the network clustering device searches for a single BSS within the communication coverage, and when a network performance metric obtained by measuring a network performance of the single BSS exceeds a performance threshold value, forming a VBSS by partitioning the single BSS to serve as an access point accommodating a portion of stations included in the single BSS; and
(d) when the network clustering device searches for a station within the communication coverage, serving as an access point accommodating the station.

14. The method in accordance with claim 13, wherein the step (a) comprises:
sub-step (a-1) wherein the network clustering device performs an authentication by connecting to the access point or the station via the second network clustering devices within the communication coverage;
sub-step (a-2) wherein the network clustering device periodically receives connection information by requesting the connection information from the access point or the station;
sub-step (a-3) wherein the network clustering device updates the routing and forwarding information by analyzing the connection information; and
sub-step (a-4) wherein the network clustering device performs a routing to the second network clustering devices by exchanging the updated routing and forwarding information with the second network clustering device.

15. The method in accordance with claim 13, wherein the step (b) comprises:
sub-step (b-1) wherein the network clustering device generates a new BSS as a leader access point;
sub-step (b-2) wherein the network clustering device receives the routing and forwarding information and connection information by requesting the same to a neighboring access point of the plurality of the BSSs
sub-step (b-3) wherein the network clustering device determines a channel to be used for each of the plurality of the BSSs and an RF transceiver unit to be used based on the routing and forwarding information and the connection information, and generates control information including an output power for each of the channel to be used and a data transfer rate of each of the channel;
sub-step (b-4) wherein the network clustering device transmits the control information to the access points of the plurality of the BSSs; and
sub-step (b-5) wherein the network clustering device performs a message relay between the plurality of the BSSs.

16. The method in accordance with claim 13, wherein the step (c) comprises:
sub-step (c-1) wherein the network clustering device determines that a network performance metric exceeds a performance threshold value by measuring a network performance of a wireless mobile communication network of the BSS;
sub-step (c-2) wherein, when the network performance metric exceeds the performance threshold value, the network clustering device declares itself as a leader access point of the VBSS;

sub-step (c-3) wherein the network clustering device receives the routing and forwarding information and connection information by requesting the same to the access point of the BSSs;

sub-step (c-4) wherein the network clustering device determines a channel to be used for the BSS and the VBSS and an RF transceiver unit to be used based on the routing and forwarding information and the connection information, and generates control information including an output power for each of the channel to be used and a data transfer rate of each of the channel;

sub-step (c-5) wherein the network clustering device transmits the control information to the station of the BSS via the access point of the BSSs; and sub-step (c-6) wherein a portion of the stations of the BSS generates another VBSS separated from the BSS by connecting to the network clustering device as the access point.

17. The method in accordance with claim 13, wherein the step (d) comprises:
sub-step (d-1) wherein the network clustering device declares itself as the access point;
sub-step (d-2) wherein the network clustering device determines an arbitrary non-interference channel to be used and an RF transceiver unit to be used and generates control information including an output power for each of the channel and a data transfer rate of each of the channel;
sub-step (d-3) wherein the network clustering device transmits the control information to the station; and
sub-step (d-4) wherein the station connects to the network clustering device as the access point.

18. The method in accordance with claim 13, further comprising steps of:
(e) when the network clustering device searches for a plurality of IBSSs within the communication coverage, performing a message relay between the plurality of the IBSSs by exchanging the routing and forwarding information with the station included in the plurality of the IBSSs;
(f) when the network clustering device searches for a single IBSS within the communication coverage, and when a network performance metric which is a measurement of the network performance exceeds a performance threshold value, generating a VIBSS by partitioning the IBSS to serve as a leader station accommodating a portion of the stations included in the IBSS.

19. The method in accordance with claim 18, wherein step (e) comprises:
sub-step (e-1) wherein the network clustering device generate a new IBSS as the access point;
sub-step (e-2) wherein the network clustering device receives the routing and forwarding information and connection information by requesting the same to a neighboring stations of the plurality of the IBSSs;
sub-step (e-3) wherein the network clustering device determines a channel to be used for each of the plurality of the IBSSs and an RF transceiver unit to be used based on the routing and forwarding information and the connection information, and generates control information including an output power for each of the channel to be used and a data transfer rate of each of the channel;
sub-step (e-4) wherein the network clustering device transmits the control information to the stations of the plurality of the IBSSs; and
sub-step (e-5) wherein the network clustering device performs a message relay between the plurality of the IBSSs.

20. The method in accordance with claim 18, wherein the step (f) comprises:
sub-step (f-1) wherein the network clustering device determines that a network performance metric exceeds a performance threshold value by measuring a network performance of a wireless mobile communication network of the IBSS;
sub-step (f-2) wherein, when the network performance metric exceeds the performance threshold value, the network clustering device declares itself as a leader station of the VIBSS;
sub-step (f-3) wherein the network clustering device receives the routing and forwarding information and connection information by requesting the same to the station of the IBSSs;
sub-step (f-4) wherein the network clustering device determines a channel to be used for the IBSS and the VIBSS and an RF transceiver unit to be used based on the routing and forwarding information and the connection information, and generates control information including an output power for each of the channel to be used and a data transfer rate of each of the channel;
sub-step (f-5) wherein the network clustering device transmits the control information to the station of the IBSS; and
sub-step (f-6) wherein a portion of the station of the IBSS generates another VIBSS separated from the IBSS by connecting to the network clustering device as the access point.

21. The method in accordance with claim 13, wherein, by respectively measuring a power of an output for each corresponding channel received from a physical layer and a wireless air interface usage occupation rate, a frame error rate due to a collision in a data link layer, a variation in a link quality and transfer data rate, a variation in a packet transfer rate in a network layer and a change rate of the routing and forwarding information, and a throughput of a corresponding network in a transport layer, the network performance metric is calculated by a weighted measurement metric from the overall measured results from each of the layers.

22. The method in accordance with claim 13, wherein the network clustering device receives a GPS signal from a GPS satellite to determine a physical position of the network clustering device, or receives a signal message exchanged for locating a position between the network clustering devices or the network clustering device and the station to further generate position information, and the routing and the forwarding information is generated based on the position information.

23. The method in accordance with claim 13, wherein the wireless mobile communication network comprises a wireless sensor network, the station comprises a sensor node, and the access point comprises a sink node.

* * * * *